July 16, 1940.   D. G. C. LUCK   2,208,377
RADIO DIRECTION FINDING
Filed Sept. 30, 1937   2 Sheets-Sheet 1
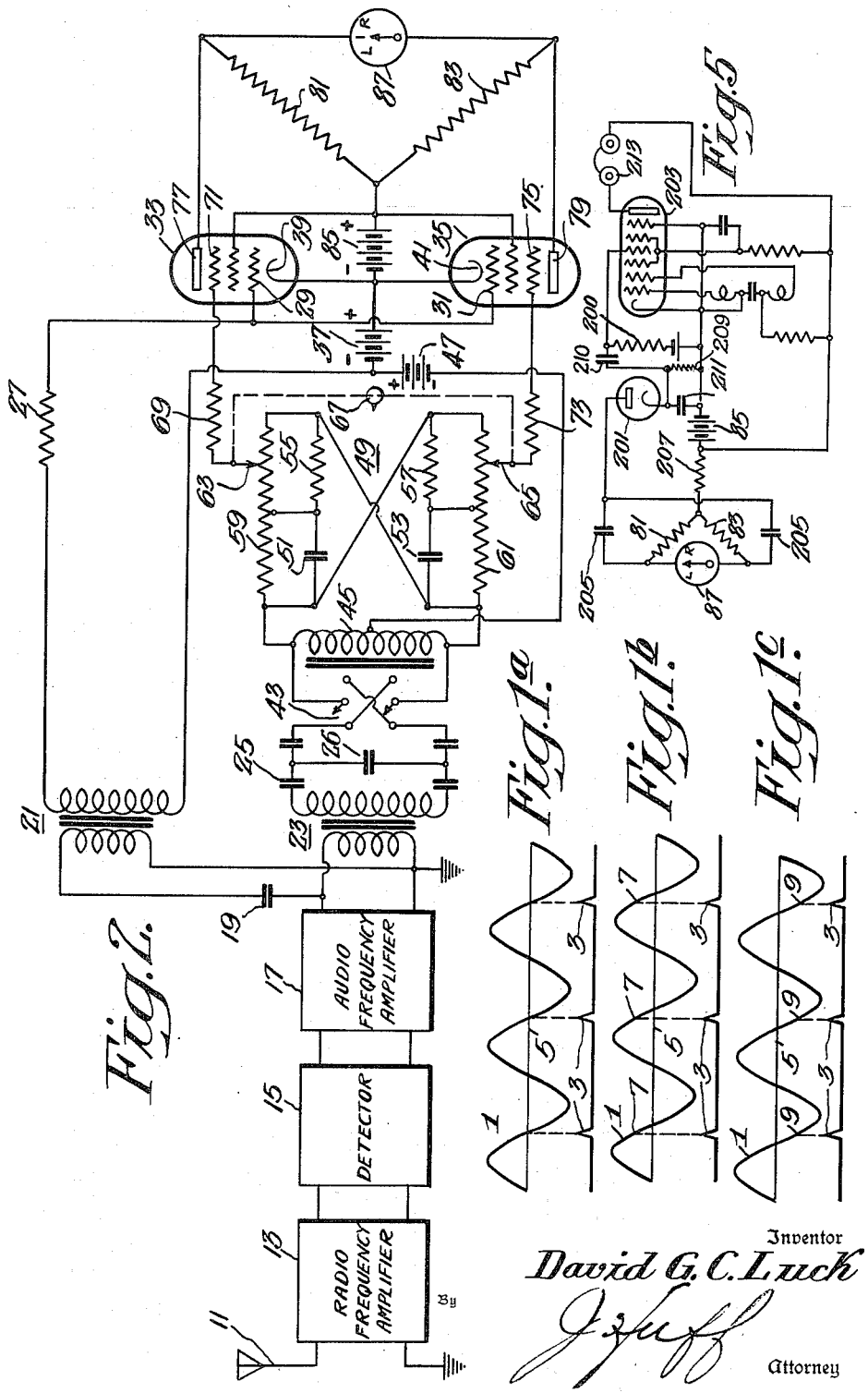
Inventor
David G. C. Luck
Attorney

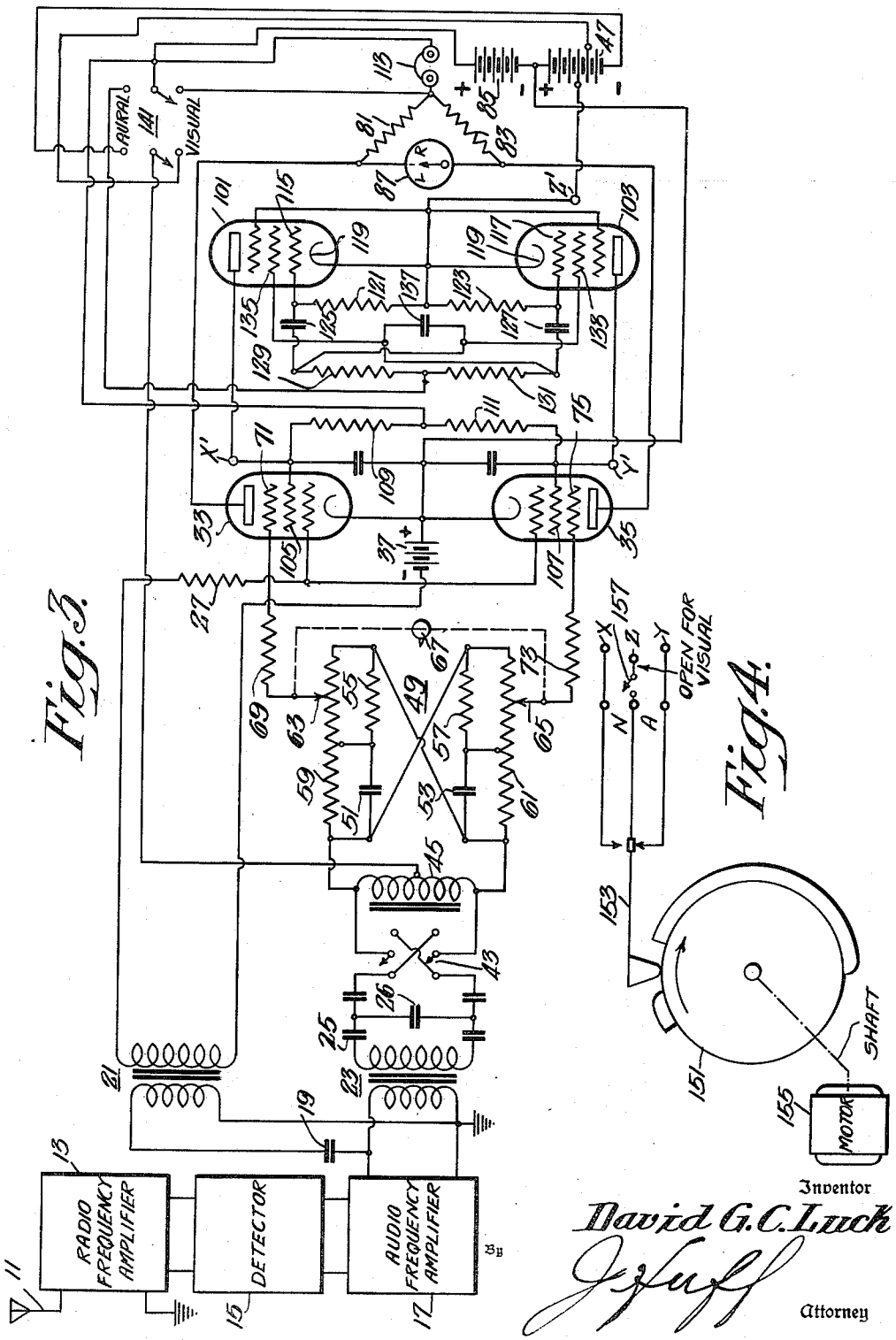

Patented July 16, 1940

2,208,377

UNITED STATES PATENT OFFICE 2,208,377

RADIO DIRECTION FINDING

David G. C. Luck, Haddon Heights, N. J., assignor to Radio Corporation of America, a corporation of Delaware Application September 30, 1937, Serial No. 166,641

14 Claims. (Cl. 250—11)

My invention relates to radio direction finding with visible or aural indication thereof. More specifically, my invention is an indicator to be actuated by a radio receiver which may be used in cooperation with a rotating radio beacon to produce "on-off," or "left-right" indications of departure from a desired course.

In my copending application Serial No. 156,055, filed July 28, 1937, I have described one form of rotating radio beacon. The radio beacon is a transmitter from which a rotating radio field of cardioid shape is radiated. The currents creating the radio field are keyed or interrupted once per revolution of the field. By way of example, at the instant when the maximum field is due north, the entire field may be keyed by interrupting the field for a short interval. The rotating field and keying thereof establish respectively a sinusoidal current, due to the rotation of the cardioid, and an impulse current, due to the keying of the field, in a radio receiver within the field. The relative phase of the sinusoidal current and the impulse current indicates the bearing of the receiver with respect to the transmitter. By way of example, if the field is interrupted when the maximum field is due north, then a receiver due east of the transmitter will indicate, for a predetermined direction of field rotation, that the interrupting impulse is 90° removed from the maximum of the received sine wave current. Likewise, receivers due south will indicate a 180° phasal relation, due west 270°, and due north 0° or 360°.

With a suitable means for continuously indicating the said phasal conditions in an aircraft radio receiver, the operator of the craft may navigate the craft over any course within range of the beacon. That is, the craft may be navigated along a path tangent to a circle about the beacon, or along a radial path toward or away from the beacon.

While the above-described system is suitable for general navigation, the system may be adapted to "left-right," or "on-off course" indication when the desired course is on a radial line through the beacon transmitter. The conventional radio ranges which are now operated by the United States Government establish definite airways or courses. Departures from these courses are indicated by "on-off" or "left-right" signals. It is, therefore, desirable to provide means whereby a radio beacon may be used to indicate courses in a manner corresponding to the existing airway indications.

The conventional radio ranges establish four specific courses. The radio beacon has the advantage of automatically establishing an infinite number of courses. The rotating beacons may be used for general navigation in accordance with my above-mentioned application, or for definite courses with "on-off" or "left-right" indications by the application of the present invention.

One of the objects of my invention is to provide means whereby radio course deperatures may be indicated.

Another object of my invention is to provide means for deriving an "on-off" or "left-right" indication of departure from a radio course.

Another object is to provide means for converting a radio beacon direction finding signal to a course departure signal.

A further object is to provide means for indicating departures from a radial line through a rotating radio beacon.

My invention will be described by reference to accompanying drawings in which

Figures 1a to 1c are schematic diagrams illustrative of the currents actuating the indicator of my invention, Figure 2 is a schematic circuit diagram of one embodiment of my invention, Figure 3 is a circuit diagram of a modification of my invention, Figure 4 is a schematic illustration of a keying device, and Figure 5 is a circuit diagram of a tone control network.

Referring to Fig. 1a, the sine wave 1 represents the sinusoidal currents derived from the rotating field about a radio beacon. The peaks 3 represent the impulses corresponding to the interruption of the beacon. For purposes of illustration, it is assumed that the receiver is so located that the sine wave crosses the zero line 5 at the instant the field is interrupted. If the sine wave is displaced to the right, as shown in Fig. 1b, the impulse 3 will no longer coincide with the wave 1 crossing the zero line 5, but will appear on a positive portion of the wave as indicated at 7. If, however, the sine wave is moved to the left, as shown in Fig. 1c, the impulse 3 will appear on a negative portion of the wave as indicated at 9.

For purposes of illustration, the sine wave 1 has been described as moving to the left or right. Rotating the receiver about a rotating beacon of the character described is equivalent to advancing or retarding the phase of the sinusoidal currents received from the beacon. Thus, if the sinusoidal currents and the impulse currents may be separated, and means provided to indicate their relative phases, movement of the receiver to the left or right of a radial course through the beacon will be indicated by a change in the indicated phase.

One suitable circuit for separating and indicating the relative phases of the signals received from a beacon of the type described is shown in Fig. 2. An antenna 11 is connected to any conventional radio receiver, such as a radio frequency amplifier 13, detector 15 and audio amplifier 17. The output circuit from the audio amplifier 17 is divided into an impulse current path and a sinusoidal current path. The impulse path is through the capacitor 19 and the primary of a transformer 21. Sine wave currents are excluded from this path by the high reactance of capacitor 19. The sine wave path consists of a transformer 23, which feeds a wave filter comprising the transformer secondary, capacitors 25 and 26, and inductor 45, which attenuates the impulse currents and passes the sine wave currents.

One terminal of the secondary of transformer 21 is connected through a resistance 27 to the grids 29—31 of thermionic tubes 33—35. The other terminal of the secondary of transformer 21 is connected to the negative terminal of a biasing battery 37. The positive terminal of the battery 37 is connected to the cathodes 39—41 of the thermionic tubes 33, 35.

The output of the transformer 23 and capacitors 25 is connected to a double pole-double throw reversing switch 43, which is in turn connected to a center tapped inductor 45. The center tap is joined to the negative pole of a biasing battery 47 as shown. The outer terminals of the inductor 45 are connected to a phase shifter 49.

The phase shifter 49 consists of a pair of capacitors 51, 53, and a pair of resistors 55, 57. Each capacitor 51, 53 is connected in series with one of the resistors 55, 57. Potentiometers 59, 61 are respectively connected across the capacitor 51, resistor 55 and capacitor 53, resistor 57 elements of the phase shifter 49. The junctions of the capacitor 51 and resistor 55, and the capacitor 53 and resistor 57 are connected respectively to a point intermediate the terminals of the potentiometer 59 and to a point intermediate the terminals of the potentiometer 61.

The sliders 63, 65 of the potentiometers may be linked together and operated by a single control knob 67. The slider 63 is connected through a resistor 69 to the grid 71 of tube 33. The slider 65 is connected through a resistor 73 to the grid 75 of tube 35.

The anodes 77, 79 of the tubes 33, 35 are connected through resistors 81, 83 to the positive terminal of a B battery 85. The negative terminal of the B battery 85 is joined to the cathodes 39, 41. A "left-right" indicating meter 87, which may be an ordinary galvanometer, is connected between the anodes 77 and 79. Battery operation has been shown for purposes of illustration. It should be understood that the power supply may be derived from any suitable source. Likewise, filament type tubes, heater type tubes, or pair of tubes in a single envelope, may be used.

The operation of the circuit of Fig. 2 is essentially as follows: The output of the audio amplifier includes sinusoidal currents and impulse currents. The former currents are impressed on the phase splitter 49, while the latter currents are attentuated. The phase splitter provides means for advancing or retarding the phase of the sinusoidal currents from 0° to 180°. The reversing switch 43 provides means for changing the phase 180° so that the phasing adjustment may also be made effective from 180° to 360°. The sinusoidal currents are impressed on the grids 71, 75 in push-pull relation. The impulse currents, after attenuation of the sine wave currents, are impressed through transformer 21 and resistor 27 on the parallel-connected grids 29, 31.

If the phase of the sine wave currents and the impulse currents is adjusted so that the impulse coincides with the zero potential of the sinusoidal currents, the effect on the "left-right" indicator 87 will be nil. This follows because the signal of zero potential applied to the push-pull grids 71, 75 will have no unbalancing effect on the output of the tubes 33, 35 and because the impulses applied to the parallel-connected grids 29, 31 merely determines the interval when the tubes are operable.

If the operator of an aircraft carrying the receiver and indicator adjusts the phase of the sine wave and impulse currents to obtain zero indication when the craft is on the desired bearing from the beacon, a departure from the radial course thus predetermined will change the phase of the sine wave current, and thereby apply A. C. potentials to the push-pull connected grids 71, 75. These potentials will unbalance the currents in the plate circuits during the impulse period, and operate the indicator to show departures to the left or right of the desired course. The entire system may be arranged so that the phase shifter knob should turn in the same direction as the indicator on an outbound radial course, and in an opposite direction on an inbound course.

In Fig. 3 is shown a modified circuit diagram. The modification includes means whereby either aural or visual signals, as selected, may be used to indicate course departures. Inasmuch as the visual indicating portion of the diagram corresponds substantially with Fig. 2, the description thereof will not be repeated. Similar reference numbers are applied to indicate similar elements in the two figures.

The portion of the circuit which lends itself to aural operation will now be described. A pair of thermionic tubes 101, 103 are connected as a multivibrator. The anodes of tubes 101, 103 are connected respectively to the screen grids 105, 107, of tubes 33, 35. The screen grids 105, 107 are lightly bypassed to cathode and are connected through resistors 109, 111 to the positive terminal of the B battery 85. The telephone receivers 113 are connected in the common lead to the anodes of tubes 33, 35 through the resistors 81, 83.

The grids 115, 117 are joined to the cathodes 119 through grid resistors 121, 123, and through capacitors 125, 127 to resistors 129, 131. The cathodes 119 are connected to a terminal on battery 47 which provides a negative bias with respect to the cathodes of tubes 33, 35. This insures that the tubes 33, 35 will be completely cut off by the signals from the multivibrator or the mechanical keyer, as hereinafter described. The junction of capacitor 125 and resistor 129, and the junction of capacitor 127 and resistor 131, are respectively connected to grids 133, 135 in tubes 101 and 103. The grids 133 and 135 are connected together by a capacitor 137 to avoid clicks from the operation of the multivibrator. The double throw-double pole switch 141 is arranged to short circuit the aural indicating device 113 and apply approximately half the cut-off bias to grids 71, 75, when in the "visual" position. When the switch 141 is in the "aural" position, B battery voltage is applied to the screen grids 133, 135 of the multivibrator tubes and bias on grids 71, 75 is increased to obtain the most satisfactory aural indication.

The theory of operation of the visual indicator has been set forth above. The operation of the aural indicator is not unlike the operation of the "A—N" signals of the present day radio ranges. In the conventional range, the transmitter is keyed so that fields of a pair of diagonally opposed quadrants include a dot-dash signal A; the fields of the other pair of diagonally opposed quadrants include a dash-dot signal N. The desired courses are indicated by a region formed by equal strength A and N signals. In this region the dot-dash and the dash-dot (A and N respectively) combine to indicate a steady signal. Departures from the desired course are indicated by a predominating A or N signal.

In the present system I prefer to use dots E for one keying signal and dashes T for the other keying signal. The dots are spaced by intervals substantially equal to the duration of the dashes which occur during said intervals. Likewise, the dashes are spaced by intervals substantially equal to the duration of said dots. "On" course is indicated by a steady signal, while "off" course is indicated by a preponderance of dots and dashes.

While the conventional radio ranges apply the keying to the transmitters, the present invention applies the keying signals to the grids 105, 107 of the tubes 33, 35. (See Fig. 3.) The multivibrator tubes are interlocked so that one tube 101 generates dot signals, and during the intervals between said dots the other tube 103 generates the dash signals. The dot signals are applied to the grid 105 of tube 33 and the dash signals are applied to the grid 107 of tube 35. The signals may be applied in the reverse sense, and in either application one of the signals, for example the dot, may correspond to the left of a desired course toward the beacon. Such unique designation is impossible in the ordinary radio ranges.

I prefer to use the E—T keying so that an aircraft operator accustomed to following the conventional A—N range will not be confused by the beacon type course. If the A—N or other interlocking signals are desired, a cam 151 operated commutator 153 may be driven by a motor 155 as shown in Fig. 4. The common terminal of the commutator 153 should include a switch 157 which is opened for visual signal indication and closed for aural signals. The terminals X, Y, Z of the commutator are connected to the terminals X', Y', Z' of Fig. 3. If the motor driven commutator is used, the multivibrator tubes are omitted. The motor driven commutator may be used for the E—T signals but I prefer the multivibrator because of the absence of moving parts.

When the aural signals are used, the operation of the circuit is essentially as follows: The vehicle carrying the receiver is pointed toward or away from the radial line through the beacon transmitter. The phase shifter 49 is adjusted so that there is zero phase between the impulse currents and the zero potential of the sine wave currents. The tubes 33 and 35 are biased to cut-off and are made operative during the period when the impulses are impressed on the parallel-connected grids. During the operative period, the potentials applied to the push-pull grids of tubes 33, 35, being zero, have no effect and therefore both tubes produce equal effects in the telephone receivers. The tubes 33, 35 are keyed respectively by an interlocked series of dots, and by an interlocked series of dashes. If the vehicle carrying the receiver departs from the desired course, the sine wave will be advanced or retarded with respect to the impulses. Thus, the potentials applied to the control grids of tubes 33, 35 will produce an output current in the telephone receivers from one of the tubes, which is greater than the output from the other tube. Since the tubes are keyed respectively by E and T signals, one of these signals will predominate in the telephones, and thereby aurally indicate a departure from the desired radial course. As previously stated, the dots may be applied to indicate the sense of the departure.

The tone of the aural signal is not pleasant because it is composed of impulses which are of relatively low repetition frequency. The low frequency train is rich in harmonics. If an amplifier, sharply tuned to a suitable harmonic, is interposed between the telephone receivers and the leads thereto, the original impulse tone will disappear and a pleasing tone will take its place. Another method of providing a pleasing audio tone is to connect a rectifier 201, and a combined audio frequency oscillator and an output tube 203 as shown in Fig. 5. The rectifier 201 is connected to the plates of tubes 33, 35 of Fig. 3 by blocking capacitors 205. A resistor 207 is substituted for the telephone receivers 113. The cathode of the rectifier is connected through a resistor 209 to the negative terminal of the B battery 85. The resistor 209 is bypassed by a smoothing capacitor 211. The resistor 209 and capacitor 211 form a filter which smoothes out the impulses but passes the slow E—T keying signals. The filtered signal currents are impressed on the control grid of tube 203 through a coupling capacitor 210. The audio oscillator section of tube 203 is connected in the conventional manner. The telephone receivers 213 are connected in the output section of tube 203. Thus connected, the audio oscillator is controlled by the E—T keying impressed on the received impulse train whereby a pleasing audio tone is established.

Thus I have described a radio receiver for converting a rotating beacon signal to a visual or aural direction finding signal which indicates departures from a desired course. The aural signals are applied at the receiver and may be dot E and dash T signals or dot-dash A and dash-dot N signals. The keying at the receiver may be electronic or electro-mechanical. The correctness of the sense of departure indicated may be determined by coordinating the movement of the phasing adjustment with the visual or aural signals. While I prefer to use multigrid tubes in applying my invention, it should be understood that any thermionic tubes may be used. For example, triodes may be employed by applying the positive impulse potentials to the anodes to thereby determine the operating period. Likewise, the phase shifter may be of any suitable design, and any suitable means may be used to separate the impulse currents from the sine wave currents.

I claim as my invention:

1. In radio direction finding apparatus, the combination of a receiver for receiving a radio frequency carrier modulated by impulse currents and sinusoidal currents, means for demodulating said modulated carrier, a filter responsive to said demodulated carrier for separating said impulse currents and said sinusoidal currents, means for adjusting the phase of said sinusoidal currents so that the zero potential thereof coincides with said impulse current, and means for indicating departures from said phasal adjustment.

2. In radio direction finding apparatus, the combination of a receiver for receiving a radio frequency carrier modulated by impulse currents and sinusoidal currents, a detector connected to said receiver for demodulating said carrier, a filter for separating after demodulation said impulse currents and said sinusoidal currents, means for adjusting the phase of said sinusoidal currents so that the zero potential thereof coincides with said impulse current, and means for visually indicating departures from said phasal adjustment.

3. In radio direction finding apparatus, the combination of means for receiving impulse currents and sinusoidal currents, means for separating said impulse currents and said sinusoidal currents, means for adjusting the phase of said sinusoidal currents so that the zero potential thereof coincides with said impulse current, and means for aurally indicating departures from said phasal adjustment.

4. In a radio direction finding device the combination of a radio receiver responsive to sinusoidal currents and impulse currents, means for separating said sinusoidal and impulse currents, a pair of multigrid thermionic tubes, means for applying said sinusoidal currents in push-pull relation to said tubes, means for applying said impulse currents in parallel relation to said tubes, and means for indicating the relative time relation of said applied sinusoidal and impulse currents.

5. In a radio direction finding device the combination of a radio receiver responsive to sinusoidal currents and impulse currents, means for separating said sinusoidal and impulse currents, means for adjusting the phase of said sinusoidal currents with respect to said impulse currents, a pair of multigrid thermionic tubes, means for applying said sinusoidal currents in push-pull relation to said tubes, means for applying said impulse currents in parallel relation to said tubes, and means for indicating the relative time relation of said applied sinusoidal and impulse currents.

6. In a device of the character of claim 4 means for keying said tubes to apply thereto signals of distinguishing characteristics.

7. In a device of the character of claim 5 means for keying said tubes to apply thereto interlocked signals of different characteristics.

8. A radio direction finder including a radio receiver responsive to sinusoidal and impulse currents, means for respectively filtering said sinusoidal currents and said impulse currents, means for advancing or retarding the phase of said sinusoidal currents so that the instant of zero potential coincides with said impulses, a pair of thermionic tubes, means for applying said impulse to said tubes to determine their period of operation, means for applying said sinusoidal currents to said tubes in balanced relation, and means connected in balanced relation to said tubes to indicate departures in said phasal adjustment.

9. In a device of the character of claim 8, means for applying interlocking signals of different characteristics to said tubes, and means responsive to said signals whereby departures in said phasal adjustment will be indicated by a characteristic signal.

10. The method of indicating departures from a radial course through a rotating radio beacon transmitter which comprises receiving a radio carrier bearing sinusoidal currents and impulse currents from said transmitter, demodulating said carrier, separating said sinusoidal currents and said impulse currents, adjusting the phase of said sinusoidal currents so that the instant of zero potential coincides with said impulse current, and indicating departures in said phasal adjustment due to a departure from said course.

11. The method of indicating departures from a radial course through a rotating radio beacon transmitter which comprises deriving from the radiated field of said transmitter a sinusoidal current, and an impulse current, separating said currents, adjusting the phase of said sinusoidal current so that the instant of zero potential coincides with said impulse current, visually indicating a balance when said sinusoidal current and said impulse currents coincide, and visually indicating departures from said phase adjustment due to a departure from said course.

12. The method of indicating departures from a radial course through a rotating radio beacon transmitter which comprises deriving from the radiated field of said transmitter a sinusoidal current and an impulse current, separating said currents, adjusting the phase of said sinusoidal current so that the instant of zero potential coincides with said impulse current, applying characteristic keying signals to said sinusoidal current, aurally indicating the balance of said characteristic signals and aurally indicating an unbalance in said characteristic signals due to a departure from said course.

13. In an apparatus of the character described in claim 3, means for establishing a pleasing audio frequency tone to indicate said departures.

14. In the method described by claim 12 the additional step of establishing a pleasing audio frequency tone to indicate said unbalance.

DAVID G. C. LUCK.